July 6, 1948.  R. K. STOUT ET AL  2,444,477
AUTOMATIC MINIATURE RADIO RANGE
FOR STUDENT TRAINING Filed Feb. 26, 1940  2 Sheets-Sheet 1

INVENTORS
RAYMOND K. STOUT
CARL W. MULLER
CARL J. CRANE
GEORGE V. HOLLOMAN
BY
ATTORNEYS

July 6, 1948.  R. K. STOUT ET AL  2,444,477
AUTOMATIC MINIATURE RADIO RANGE
FOR STUDENT TRAINING
Filed Feb. 26, 1940  2 Sheets-Sheet 2
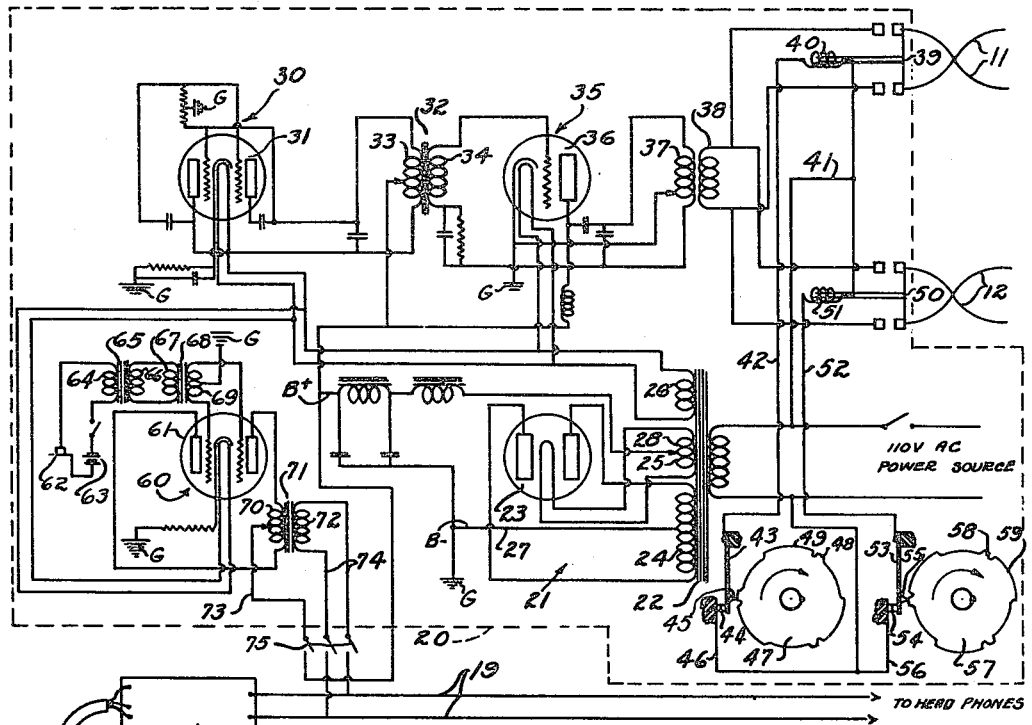
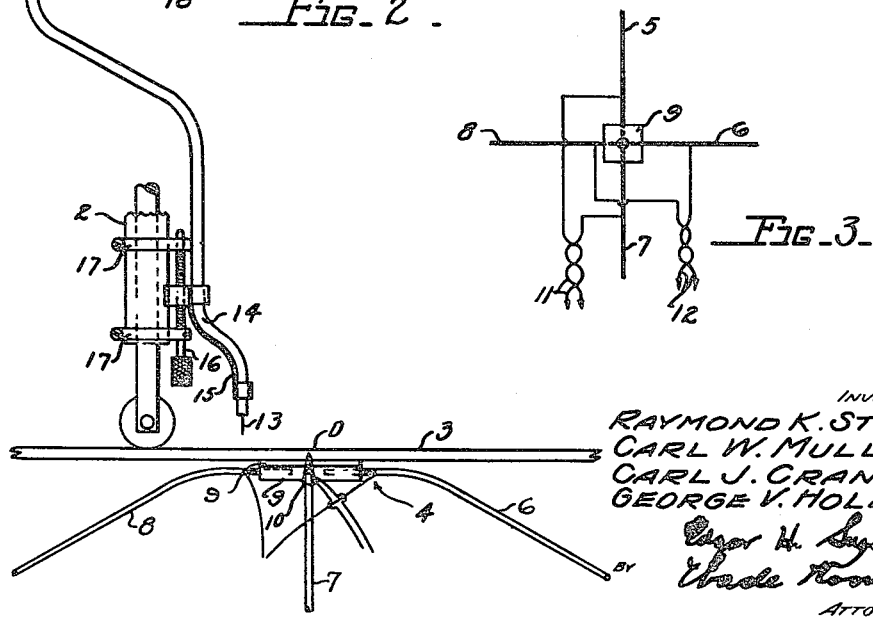
INVENTORS
RAYMOND K. STOUT
CARL W. MULLER
CARL J. CRANE
GEORGE V. HOLLOMAN
BY
ATTORNEYS Patented July 6, 1948

2,444,477

UNITED STATES PATENT OFFICE 2,444,477

AUTOMATIC MINIATURE RADIO RANGE
FOR STUDENT TRAINING

Raymond K. Stout, Dayton, Carl W. Muller, Osborn, and Carl J. Crane and George V. Holloman, Dayton, Ohio Application February 26, 1940, Serial No. 320,878

21 Claims. (Cl. 35—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an automatic miniature radio range for use in combination with a recorder for aviation ground trainers.

In aviation ground trainers heretofore in use, the trainer controls a distant recorder device in a manner, that all changes in azimuth heading of the trainer cause a similar change in direction of travel of the recorder over a record sheet, such as a map. The recorder is propelled over the record surface by feed rollers at a constant velocity, simulating a constant air speed in flight. The recorder traces a path on the map surface simulating in a small scale the flight of a full sized aeroplane.

An instructor watches the indication given by the tracer wheel of the recorder and operates a manually controlled signal system to indicate to the student, whether or not he is simulating flight on the proper course to reach a certain predetermined destination. The signals are given, so as to simulate flying on a radio range course and when the student is off to the right of the proper course in certain quadrants of the radio range he hears the familiar N signal when flying directly toward the transmitter at the desired destination and if off to the left of the proper course he hears the A signal, while if on the proper course he hears a continuous signal. To properly simulate radio range flying the instructor must also vary the volume of the signal, as the simulated transmitter at the landing destination is approached. The manual operation of the signalling system thus requires a great deal of dexterity and skill, if good results are to be obtained and the instruction is thus definitely affected by the skill of the individual instructor.

The present invention relates to a means for automatically signalling the student in an aviation ground trainer any departure from a predetermined radio range course, on the recorder map. The invention employs a miniature radio transmitter, employing a novel antenna system, which permits a conventional radio range to be established with reference to any desired point on the record map, so that the A and N and On Course signals will be heard by the student in the proper relation to the simulated course to be flown. A pick up device carried by the recorder conducts the signals to a receiver placed in the trainer cockpit, which can be manually tuned by the student. The pick up cooperates in a novel manner with the radio range antenna so as to accurately simulate the variation in signal volume, which would take place in actual flight, in approaching the radio range transmitter and simulates the cone of silence zone directly over the transmitter of the radio range in a realistic manner.

The principal object of this invention is the provision of a miniature radio range for aviation ground trainers, which simulates an actual radio range and permits signals to be given automatically to the student without the intervention of the instructor.

Another object of the invention is the provision of a novel radio range transmitter antenna, which cooperates with a signal pick up, carried by the recorder of an aviation ground trainer, so that the signal volume varies as the signal pick up is moved toward the cone of silence zone of the transmitter.

A further object of the invention is the provision of a miniature radio range for aviation ground trainers, in which the transmitter antenna is located adjacent the ground trainer record sheet, to be in cooperative relation to the signal receiver pick up carried by the ground trainer recorder and the antenna being adjustable to give a simulated cone of silence zone of a desired character.

Another object of the invention is the provision in an aviation ground trainer, of a miniature radio range having the transmitter or receiver antenna adjustable relative to a record sheet, so as to vary the diameter of a simulated cone of silence and to vary the simulated effect of altitude above the transmitter station.

A further object of the invention is a novel arrangement of a signal pick up device carried by the recorder of an aviation ground trainer, so that the change in position of the recorder controls the nature of signal received by said signal pick up device.

Another object of the invention is the provision of a means to transmit verbal instruction simultaneously with the transmission of an automatic miniature radio range signal to an aviation ground trainer signal receiver.

Other objects of the invention will become apparent by reference to the specification and the accompanying drawings which form a part thereof.

Referring to the drawings:

Fig. 2 illustrates the transmitter circuit for the miniature radio range, the antenna array and the manner in which the recorder pick up device cooperates with the antenna array to transmit a signal to a signal receiver; and Fig. 3 is a plan view of the antenna and its connections to the transmitter output leads.

Figure 1:
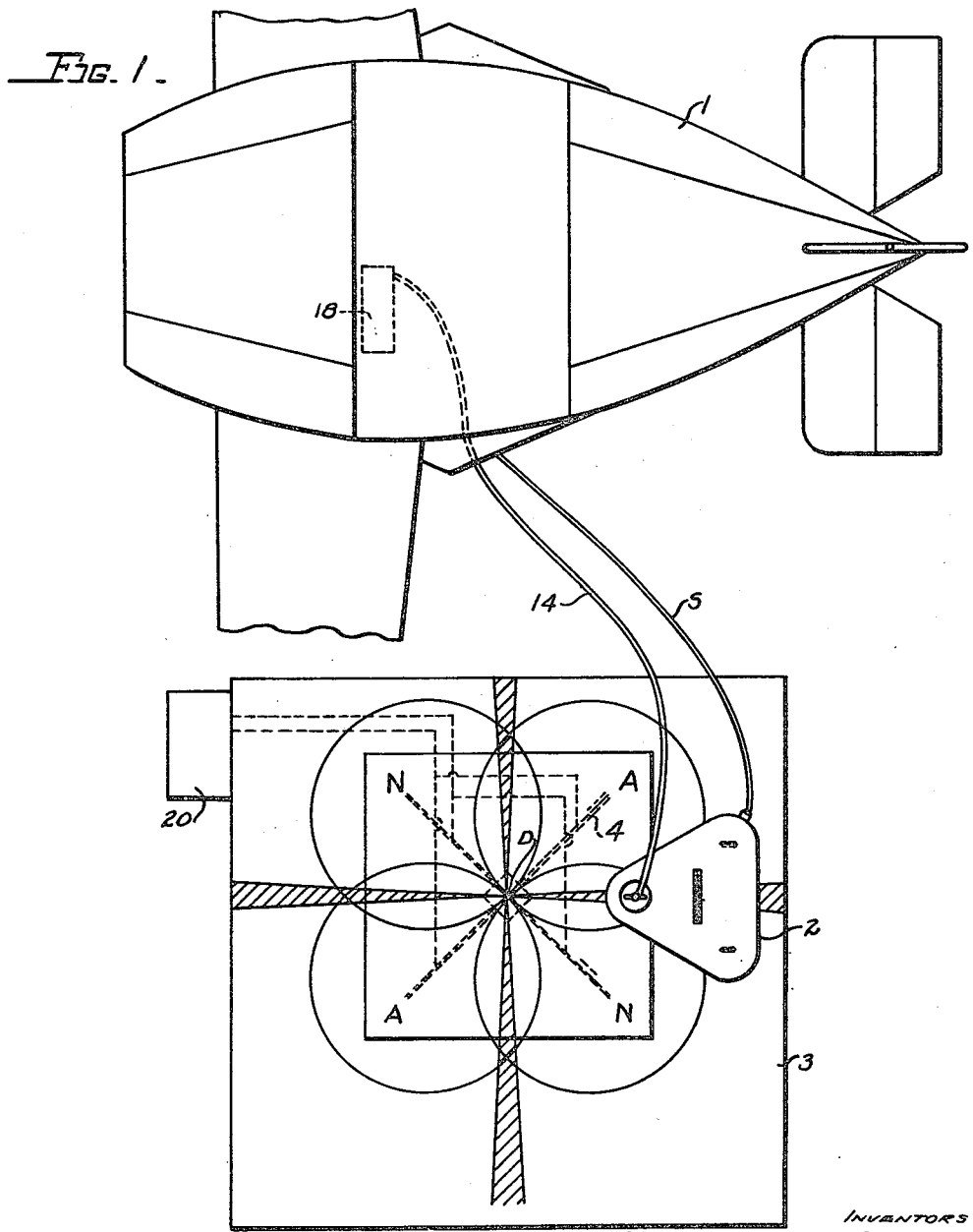
Fig. 1 illustrates a miniature radio range set up relative to a record table used in conjunction with an aviation ground trainer.

As seen in Fig. 1, the reference numeral 1, indicates an aviation ground trainer of a type, such as illustrated and described in United States Patents Nos. 1,825,462 and 2,099,857 granted to Edwin A. Link, Jr. The trainer 1, is connected by means of an electrical transmission S, of the alternating current self-synchronous transmitter and receiver type such as described in "Instruments Magazine," page 71, issue of March 1932, to a recorder 2, of a type well known in the art and a suitable type being illustrated and described in United States Patent No. 1,293,747 to Hannibal C. Ford and the United States Patent No. 2,145,063 to Edwin A. Link, Jr. The recorder 2, is propelled by power driven rollers over the surface of a map, or record table 3, at a constant speed, simulating the speed of an aeroplane represented by the trainer 1. The electrical transmission S connecting the trainer and the recorder causes any change in azimuth heading of the trainer to cause a similar change in the planes of the driving rollers of the recorder, so that the recorder travels over the surface of a record sheet placed on the record table in a manner to simulate the flight of the trainer between two selected points.

The point D on the record table is the assumed destination toward which the simulated aeroplane is heading. Where it is desired to make the point D represent a radio range beacon, such as a particular beacon used by the United States Department of Commerce on the airways, an antenna array generally indicated by the numeral 4, is placed with the antenna center directly beneath the point D, on the underside of the record table 3.

The antenna array 4, comprises four metal antennas, or rods 5, 6, 7 and 8 respectively, spaced ninety degrees apart and secured to a fibre centerpiece 9, secured to the record table 3, by a fibre screw 10. The antenna rods 5 and 7, are connected by means of leads 11 to a radio transmitter generally indicated by the reference numeral 20 and when energized give off electromagnetic waves in a figure eight pattern, as shown in Fig. 1. The rods 6 and 8 are connected by leads 12, to the transmitter 20 and when energized give a similar radiation pattern. To vary the intensity of the radiation from the center of the antenna array radially outward, the antenna rods are curved downwardly as seen in Fig. 2 and by moving the antenna assembly downward relative to the record table, by inserting or removing one or more fibre spacers 9' between the fibre centerpiece 9 and the table 3 the effect of altitude can be simulated. Since the radiation pattern in the vertical plane from each antenna rod is also elliptical, a zone of zero radiation, or cone of silence will occur directly over the center of the antenna array and its diameter may be adjusted by adjustment of the antenna array vertically with reference to the record table. The radiation pattern loops intersect and overlap along lines spaced forty-five degrees from the planes of the antenna rods and when the transmitter output to the antenna rods 5 and 7 is keyed to transmit the signal letter A (dot dash) and the output to the antenna rods 6 and 8 is keyed to transmit the letter N (dash dot), the effect of a continuous signal will be heard in a receiver having a signal pick up located at some point in a narrow range along the lines of intersection of the radiation loops. The continuous signal is the on course signal while the A or N signal will be heard when off the range course, depending upon the quadrant in which the receiver signal pick up is located.

As illustrated in Fig. 2, a receiver antenna pick up 13, connected to a cable 14, is supported by a bracket 15, adjustably mounted on a screw 16, carried by removable clamps 17, secured to the frame of the recorder 2. The manual adjustment of the screw 16 permits the pick up 13, to be vertically adjusted relative to the antenna array, to further adjust the reception characteristics to simulate altitude. As shown in Fig. 2, the pick up 13 is located adjacent the marker wheel of the recorder 2. The cable 14, serves to connect the pick up antenna 13, with the radio receiver 18, preferably located in the ground trainer cockpit and capable of being tuned to the frequency of the transmitter 20. The receiver 18 may be of any suitable type and its output may be conducted by leads 19, to a pair of headphones (not shown) worn by the student when operating the ground trainer.

A transmitter suitable for the miniature radio range is shown in Fig. 2, it being understood that the circuit shown is by way of example only and other transmitter circuits are readily adapted for the same purpose. The transmitter 20, is provided with a power supply unit 21, having a transformer 22, with its primary winding connected to a suitable alternating current supply, a center tapped secondary coil 24, has its end terminals connected to the plates of a full wave rectifier tube 23. The filament of the rectifier tube is supplied from a second center tapped secondary winding 25, of the transformer 22 and a third secondary winding 26, supplies alternating current at the proper voltage for the cathode heaters in the vacuum tubes 31, 36 and 61 respectively. The center tap 27, of the transformer winding 24 is grounded and forms the negative high voltage direct current output terminal, while the center tap 28, of the filament winding 25, is the positive high voltage direct current terminal, which is connected to supply the plate circuits of the vacuum tubes 31, 36 and 61 respectively. The cathodes of the alternating current tubes 31, 36 and 61 are each grounded and thus have the same potential as the negative terminal of the power supply. All common connections to the negative terminal B— of power supply 21 are indicated by the reference character G.

A twin triode vacuum tube 31, is arranged in an audio oscillator circuit 30 and its output is delivered to the primary 33, of the modulation transformer 32. The primary 33 of the modulation transformer forms a part of the audio oscillator circuit. The secondary winding 34, of the modulation transformer 32, is connected in the grid circuit of a Hartley radio frequency oscillator circuit 35. The radio frequency oscillator employs an alternating current type triode 36 and the high frequency output of the circuit passes through the tank coil 37, which is inductively coupled to the inductance coil 38, of the aerial circuit.

The radio frequency oscillator 35, oscillates at a radio frequency determined by the circuit constants which can be adjusted as desired and the audio frequency oscillator 30, modulates the radio frequency carrier wave so that an audible signal will be heard in the receiver.

The antenna inductance 38, is connected in parallel by means of solenoid switches 39 and 50, to the non-inductive antenna leads 11 and 12, respectively, which are connected to the antennas in a manner heretofore described. The solenoid switches 39 and 50, serve as means to key the transmitter output to the separate antenna pairs to give the familiar A and N signals to the antennas 5—7 and 6—8, respectively.

The solenoid switch 39, has a coil 40, one end of which is connected to the alternating current power supply by means of the conductor 41 and the other end of the coil 40, is connected by means of the conductor 42, to a flexible contact arm 43, which is adapted to engage a contact 44, connected by means of a conductor 46, to the other side of the alternating current power supply. A projection 45, on the contact arm 43, is engaged by a cam 47, having projections 48, which close the contacts at 43 and 44 to form a dot signal in the antenna 5—7 and projections 49, on the cam 47, similarly produce a dash signal when the cam 47 is rotated clockwise as indicated by the arrow in Fig. 2. The projections 48 and 49 on the cam 47, are arranged to give the dot-dash signal corresponding to the letter A, at predetermined equal intervals determined by the speed of rotation of the cam 47.

The transmitter output to the antenna 6—8 is keyed in a similar manner as above described. The solenoid switch 50, has a coil 51, one end of the coil being connected to one side of the alternating current power source by means of the conductor 41 and the other side of the coil 51, is connected by means of a conductor 52, to a flexible contact arm 53, which can engage a contact 54, connected by a conductor 56, to the lead 46, which as before stated, connects to the other side of the alternating current power supply. The contact arm 53, is provided with a projection 55, which is adapted to be engaged by a cam 57, having projections 58, which close the contacts at 53 and 54, to form a dot signal in the antenna 6—8 and projections 59, on the cam 57, similarly produce a dash signal, when the cam is rotated clockwise, as indicated by the arrow in Fig. 2. The projections 58 and 59 on the cam 57 are arranged to give the dash-dot signal corresponding to the letter N at predetermined equal intervals determined by the speed of rotation of the cam 57. The cams 47 and 57 are arranged on a common shaft and rotated at a constant speed so as to send out the A and N signals a given number of times per minute. The cams as shown will give three signals per revolution.

Although only the A and N signal cams are illustrated, additional cams may be provided to key the transmitter to send out a definite station identifying signal at definite intervals, the A and N signals being blocked out during the transmission of the station identifying signal. Such keying apparatus is well known in the art and for purposes of simplicity is not illustrated.

While a simple keying apparatus has been shown, grid circuit, or plate circuit keying methods are equally well adapted for keying the output of the transmitter.

The phase relation between the antennas can be adjusted by the insertion of a resistance in one of the antenna circuits, or a goniometer may be used for phasing the antennas as in the full size radio range beacon transmitters.

In order to transmit aural instructions from the instructor to the student in the trainer cockpit a phone transmission 60, is connected to the phone connections 19, of the receiver 18. The phone transmission 60, includes a twin triode alternating current type amplifier tube 61. A microphone of the carbon button type 62, is connected in series with a battery 63 and the primary 64, of a transformer 65. The secondary 66 of the transformer 65 is connected in series to the primary 67, of the transformer 68, the secondary 69 of which is connected to the grids of the tube 61 and a center tap on the secondary 69 is grounded. The microphone 62 will then modulate the current in the plate circuits of the tube 61. The plates of the tube are connected to the primary 70, of a transformer 71, the center tap 73 of which is connected to the positive high voltage output of the power supply unit 21. The secondary 72, of the transformer 71, is adapted to be connected by means of conductors 74 to the headphone conductors 19 of the receiver 18. A three-pole single throw switch 75, is used to connect the phone transmission to the headphones at the will of the instructor. It is thus seen that the student can receive both the A and N signals and aural instructions without the use of separate receivers. The strength of the phone transmission signal may be adjusted to such a value that the interference effect of the A and N signals is negligible, or if desired, an additional switch may be employed to cut out the A and N signals from the receiver 18 when the phone transmission is used.

In operation the aviation ground trainer is placed on an azimuth heading corresponding to the proper bearing of the starting point of the simulated flight with respect to the destination corresponding to the point D (Fig. 1) and the recorder is then placed in operation on the map table. The transmitter is placed in operation and the student will hear the A or N signals depending upon what quadrant the simulated flight is to start and upon hearing the continuous on course signal, proceeds to simulate flight toward the destination, which is indicated by an increase in signal volume due to the arrangement of the antenna array as heretofore described. Shortly after the signal volume reaches a maximum, the recorder will pass over the cone of silence at a distance from the station point D depending on the simulated altitude of the flight which can be adjusted in the manner described. The student then applies any of the conventional methods of orientation in order to prepare for the simulated landing. At any time during the simulated flight the instructor may switch on the phone transmission and transmit verbal instructions to the student, or give information such as simulated weather reports.

By using a plurality of miniature radio ranges each having a different frequency and where desired each having a station call signal the student may then tune the receiver 18 to any of the radio beacons desired and may conduct the simulated flight in the same manner as if flying on an airway provided with interconnecting radio ranges.

We have thus described an automatic miniature radio range for use with aviation ground trainers, which imbues the student with a sense of realism and confidence, since the personal factor of the instructor is eliminated.

The device disclosed is by way of illustration only, a simple device using a minimum number

We claim:

1. In combination with an aviation ground trainer, a record sheet, a recorder adapted to indicate the supposed flight path of said trainer upon said record sheet, a radiant energy signal generating device for emanating signals adjacent said record sheet in a predetermined pattern in space relative to a predetermined point on said record sheet, a signal pick up device carried by said recorder and a signal receiver mounted in said trainer for receiving signals corresponding to the position of said signal pick up relative to said point on said record sheet.

2. In an aviation ground training system in combination, an aviation ground trainer adapted to simulate aeroplane flight, a reference surface, an element movable relative to said surface, in a direction and at a velocity representing the simulated flight course of said aircraft, a means for generating electromagnetic radiant energy signals in the form of a radio beacon pattern having a definite relation in space, to a predetermined point on said reference surface, means for causing a variation in radio signal intensity varying with the radial distance from said point on said reference surface, radio signal pick up means mounted on said element and a radio receiver connected to said pick up means for receiving said range signals of a type and intensity depending upon the location of said pick up means relative to said point on said reference surface.

3. The structure as claimed in claim 2, in which the means for generating the radio range beacon pattern includes an antenna array comprising a plurality of antenna arms, means for mounting the antenna array in a definite relation to said reference surface and means for adjusting the vertical distance between points along said antenna arms and said reference surface.

4. The structure as claimed in claim 2, in which said signal pick up means is vertically adjustable relative to said reference surface.

5. An automatic miniature radio range for aviation ground trainers comprising, a reference surface, a radio transmitter means for generating radio signals, an antenna assembly connected to said transmitter, including a first antenna for radiating certain radio signals directionally in one plane with reference to said reference surface and a second antenna for radiating different radio signals than said certain radio signals, directionally in a plane other than said first named plane, means movable relative to said reference surface in accordance with the assumed flight path of the ground trainer and signal receiver pick up means mounted on said relatively movable means.

6. The structure as claimed in claim 5, in which each antenna is adjustable to alter the radiation pattern in vertical planes relative to said reference surface.

7. The structure as claimed in claim 5, in which each antenna is mounted adjacent the reference surface in a definite relation to a point on said reference surface and each antenna being shaped to produce a radiation of varying intensity in horizontal planes parallel to said reference surface in accordance with the radial distance from said point on said reference surface.

8. The structure as claimed in claim 5, in which the signal receiver pick up means is adjustable to vary the coupling effect between said antennas and said pick up means.

9. In combination, an aviation ground trainer, a reference surface, an element movable relative to said reference surface and controlled by said trainer to represent the assumed flight course of said trainer, a means for generating and radiating radio signals in the form of a miniature radio range beacon pattern with reference to a point on said reference surface, a radio signal receiver mounted in said trainer, a radio range signal pick up movable with said element and connected to said radio receiver.

10. The structure as claimed in claim 9, in which the means for generating and radiating the radio signals includes an antenna array centrally mounted with respect to said point on said reference surface, said antenna being adjustable in a vertical plane relative to said reference surface.

11. The structure as claimed in claim 9, in which the means for generating and radiating the radio signals includes an antenna array comprising a plurality of arms centrally mounted with reference to a point on said reference surface, said antenna arms being curved to a predetermined shape in a vertical plane relative to said reference surface.

12. In a miniature radio range for use in aviation ground training systems, a record table, an antenna array mounted centrally with respect to a point on said table, a means for energizing said antenna array to radiate radiant energy in predetermined directional patterns, said patterns being such as to create a conical zone of zero radiation adjacent said point on said record table and means for adjusting the antenna array to vary the diameter of the zone of zero radiation in the plane of said record table.

13. The structure as claimed in claim 12, including a radiant energy pick up means having a controlled motion relative to said record table and signal receiving means connected to said radiant energy pick up means.

14. The structure as claimed in claim 12, including a radiant energy signal pick up means having a controlled motion in a horizontal plane relative to said record table and means for adjusting the vertical position of said signal pick up means relative to said record table.

15. In combination with a record table for an aviation ground trainer, an antenna array secured in a fixed relation to a point on the table surface and means for energizing said antenna so as to propagate radiant energy signals relative to the said point on the table surface and means for adjusting the radiation pattern in horizontal and vertical planes relative to said record table surface.

16. In apparatus of the character described, a reference surface, an element movable relative to said surface at a velocity and in a direction representing the assumed flight course of an associated training device, means for propagating a radiant energy signalling field adjacent to said reference surface and relative to a point thereon, said point being related to said course and means for receiving signals radiated in said field, with an intensity dependent on the relative distance between said point and said signal receiving means.

17. In combination, an aviation ground trainer for simulating the flight path of an aircraft relative to the surface of the earth, a reference surface, an element controlled by said trainer relatively movable with respect to said reference surface in a manner equivalent to the assumed flight path of said trainer, means for setting up electromagnetic signal radiations with respect to a point on said reference surface, a signal pick up means carried by said element, a signal receiver connected to said pick up means for giving a signal in accordance with the signal transmitted by said pick up means and other means connected to said signal receiver for transmitting information other than said signals to said signal receiver.

18. The structure as claimed in claim 17, in which the signal receiver may simultaneously receive the signal transmitted by said signal pick up means and said information other than said signals.

19. An automatic signalling system for an aviation ground trainer, comprising a supporting surface, a radiant energy signal generating device for emanating radiant energy signals adjacent said supporting surface in a predetermined pattern in space relation to a predetermined point on said surface, an element movable to said surface at a velocity and in a direction representing a component of the assumed flight path of the associated trainer, a signal pickup carried by said element, and a receiver connected to said signal pickup for receiving signals within the operative range of said pattern, variable in accordance with the position of said signal pickup relative to said predetermined point on said surface.

20. In an automatic signalling system for aviation ground trainers, a reference surface, a radiant energy signal generating device for emanating radiant energy signals adjacent said reference surface in a predetermined pattern in space relative to a predetermined point on said reference surface, and a signal pickup relatively movable with respect to said surface for picking up said radiant energy signals dependent upon the position of said pickup relative to said predetermined point.

21. In an aviation pilot instructing device or the like, a ground trainer adapted to be manipulated by the pupil, and a flight-simulating apparatus remote from and controlled by said trainer and including signal emitting means and an aircraft-indicating element; signal receiving means for the pupil adapted to be used in conjunction with said trainer, said signal emitting means including a simulated radio range signal field, means for moving said element to any position in respect to said signal field, said element and signal emitting means being so constructed and arranged that the direction and strength of the signals received by said signal receiving means vary in accordance with the position of said element relative to said signal emitting means.

RAYMOND K. STOUT.
CARL W. MULLER.
CARL J. CRANE.
GEORGE V. HOLLOMAN.

REFERENCES CITED

The following references are of record in the file of this patent:

UNITED STATES PATENTS

| Number | Name | Date |
| --- | --- | --- |
| 1,293,747 | Ford | Feb. 11, 1919 |
| 1,825,462 | Link | Sept. 29, 1931 |
| 2,099,857 | Link | Nov. 23, 1937 |
| 2,119,083 | Link | May 31, 1938 |
| 2,164,412 | Koster | July 4, 1939 |
| 2,179,663 | Link | Nov. 14, 1939 |
| 2,226,726 | Kramer | Dec. 31, 1940 |